United States Patent
Coumou

(10) Patent No.: US 6,627,464 B2
(45) Date of Patent: Sep. 30, 2003

(54) ADAPTIVE PLASMA CHARACTERIZATION SYSTEM

(75) Inventor: David J. Coumou, Webster, NY (US)

(73) Assignee: ENI Technology, Inc., Rochester, NY (US)

( * ) Notice: Subject to any disclaimer, the term of this patent is extended or adjusted under 35 U.S.C. 154(b) by 90 days.

(21) Appl. No.: 09/778,453

(22) Filed: Feb. 7, 2001

(65) Prior Publication Data

US 2002/0132479 A1 Sep. 19, 2002

(51) Int. Cl.[7] .............................................. H01L 21/00
(52) U.S. Cl. ............................... 438/9; 438/9; 438/710; 703/2; 703/10
(58) Field of Search ............................... 438/8, 9, 710; 703/2, 10

(56) References Cited

U.S. PATENT DOCUMENTS

| | | |
|---|---|---|
| 4,846,920 A | 7/1989 | Keller et al. |
| 4,954,212 A | 9/1990 | Gabriel et al. |
| 5,135,604 A | 8/1992 | Kumar et al. |
| 5,175,472 A | 12/1992 | Johnson et al. |
| 5,576,629 A | 11/1996 | Turner et al. |
| 5,664,066 A * | 9/1997 | Sun et al. ..................... 395/23 |
| 5,711,843 A * | 1/1998 | Jahns ........................... 216/60 |
| 6,246,972 B1 * | 6/2001 | Klimasauskas ................ 703/2 |
| 6,313,584 B1 * | 11/2001 | Johnson et al. ......... 315/111.21 |
| 6,351,683 B1 * | 2/2002 | Johnson et al. ............. 700/121 |

OTHER PUBLICATIONS

Morabito et al., "A fuuzy–neural approach to real time plasam boundary", Proceedings International Conference on Neural Networks, Jun. 1997 vol 1 pp. 43–47 abstract only.*

Geisler et al., "Neurofuzzy Modeling of Chemical Vapor Depoisition Processes", IEEE Transactions on Semiconductor Manufacturing vol. 13 No. 1 Feb. 2000 pp. 46–60.*

* cited by examiner

*Primary Examiner*—Robert Kunemund
(74) *Attorney, Agent, or Firm*—Harness, Dickey & Pierce, P.L.C.

(57) ABSTRACT

An adaptive plasma characterization system and method characterize a semiconductor plasma process using fuzzy logic and neural networks. The method includes the step of collecting input and output training data, where the input training data is based on variables associated with electrical power used to control a plasma chamber and results from execution of the plasma process. The method further includes the step of generating fuzzy logic-based input and output membership functions based on the training data. The membership functions enable estimation of an output parameter value of the plasma process, such that the membership functions characterize the plasma process with regard to the output parameter. Modifying the membership functions based on a neural network learning algorithm and output data provides ability to learn. Thus, etching process parameters such as etch rate, end point detection, and chamber maintenance can all be characterized in a manner that allows the system to operate autonomously.

15 Claims, 9 Drawing Sheets

ADAPTIVE PLASMA CHARACTERIZATION SYSTEM

FIELD OF THE INVENTION

The present invention relates to semiconductor plasma etching. More particularly, the invention relates to a method and system for characterizing a semiconductor plasma process using fuzzy logic and neural networks.

BACKGROUND AND SUMMARY OF THE INVENTION

In the semiconductor industry, plasma etching has become an integral part of the manufacture of semiconductor circuits. For example, plasma etchers are frequently used in semiconductor processing when a relatively straight vertical edge is needed. For instance, when etching the polysilicon gate of a MOS transistor, undercutting the polysilicon can adversely affect the operation of the transistor. Undercutting is frequently encountered when etching is performed using a liquid etching method. Plasma etching, which uses ions accelerated by an electric field, tends to etch only horizontal exposed surfaces and therefore avoids undercutting.

An important aspect of all plasma processes is stopping the plasma process after the layer being etched has been removed but before the next layer down is destroyed. This is often called "end point" detection—for detecting the completion of etching of a particular layer. Determining the etch rate is often critical in end point detection. Another important aspect of plasma processes is chamber maintenance. Chamber maintenance involves tracking the condition of various equipment used in the plasma process to determine when cleaning, repair, or other changes need to be made.

Conventional approaches to end point detection and etch rate determination involve the use of devices such as residual gas analyzers, crystal peering scopes (visual inspection), and scanning spectrophotometers. In the case of scanning spectrophotometers, the process engineer can visually inspect the plasma for color changes which provide an indication of the etch rate. When the derivation of the etch rate becomes zero, the end point can be inferred. Residual gas analyzers operate similarly by monitoring the off gas content of the plasma process. All of the above approaches allow process engineers to monitor "outputs" of the plasma process in order to control the process.

In recent years, the monitoring of the radio frequency (RF) power (i.e., the inputs) delivered to the plasma chamber has become a valuable technique in end point detection and etch rate determination. For example, by monitoring the variables associated with the electrical power used to control the plasma chamber, a number of process-related determinations can be made.

Although a number of data collection techniques using probes such as impedance analyzers have been developed, room for improvement in the characterization still remains. For example, while process engineers typically characterize the plasma process based on the above variables, the result is both labor intensive and inaccurate. With regard to end point determination, engineers typically use the fact that certain frequencies of light transmission can be used in determining whether the etching end point has been reached. The selection of these frequencies, however, is done on a trial and error basis. The result is a relatively expensive process characterization approach that is latent with inaccuracies. Once the process has been characterized, output parameter values are predicted based on subsequent input values. Thus, if the RF input suggests a certain output value based on collected training data, that output parameter value is somewhat predictable under conventional approaches.

While the above-described conventional process characterization techniques are somewhat useful in certain instances (despite their labor intensive aspect), it is important to note that other difficulties still remain. One particular difficulty relates to the fact that the input parameters to a plasma process are not "cut and dry" in relation to the output of the plasma process. Thus, while the process engineer may be able to glean from the plasma process a few of the specifics necessary to truly control the process, the conventional approach fails to address the subtle nuances of the process. It is therefore desirable to provide a method for characterizing a semiconductor plasma process that provides "membership functions" that enable the estimation of output parameter values and are not subject to the above-described shortcomings.

The above and other objectives are provided by a method for characterizing a semiconductor plasma process in accordance with the present invention. The method includes the step of collecting training data, where the training data is based on variables associated with electrical power used to control a plasma etching chamber and resulting from execution of the plasma process. The method further includes the step of generating fuzzy logic-based input and output membership functions based on the training data. The membership functions enable estimation of an output parameter value of the plasma process such the membership functions characterize the plasma process with regard to the output parameter. Using fuzzy logic accounts for the inherent inaccuracies in the training data. The result is a characterization of the plasma process that is more reliable than conventional approaches.

Further in accordance with the present embodiment, a method for estimating an output parameter value of a semiconductor plasma process is provided. The method includes the step of collecting input data, where the input data is based on variables associated with the electrical power used to control a plasma etching chamber and corresponding to execution of the plasma process. The method further provides for estimating the output parameter value based on fuzzy logic-based input and output membership functions. The method also provides for modifying the membership functions based on a neural network learning algorithm and output data. The output data defines an actual parameter value resulting from execution of the plasma process.

In another aspect of the invention, an adaptive plasma characterization system has an impedance analyzer, a fuzzy inference system, and a neural network. The impedance analyzer is connected to a plasma etching chamber, wherein the analyzer collects data resulting from execution of a plasma process. The data is based on variables associated with electrical power used to control the plasma etching chamber. The algorithm generates the fuzzy-logic based input and output membership functions and associated fuzzy rules set of the fuzzy inference system based on the data, where the fuzzy inference system enables autonomous estimation of the output parameters of the plasma process. A neural network modifies the membership functions based on a neural network learning algorithm and output data. The output data defines an actual parameter value resulting from execution of the plasma process.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
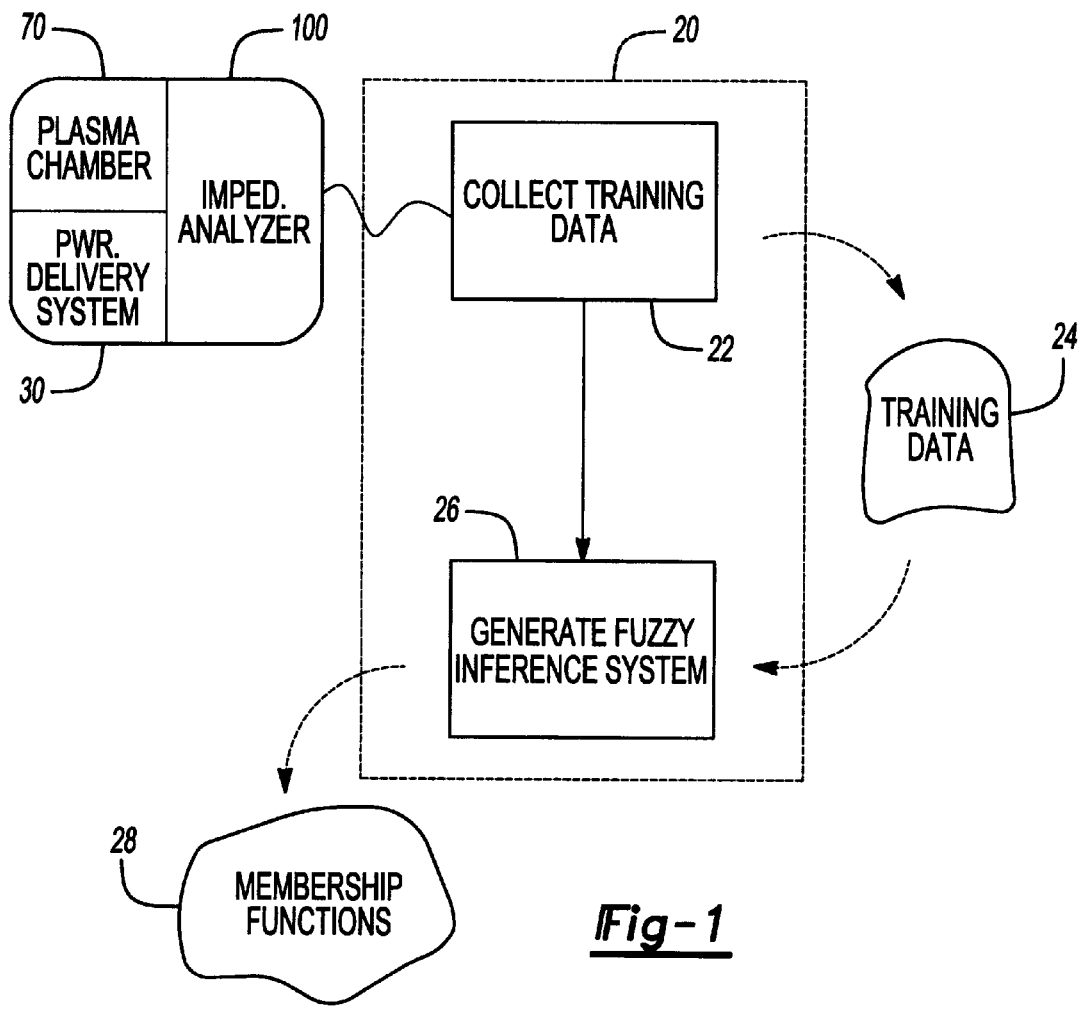
FIG. 1 is a flow diagram showing a method for characterizing a semiconductor plasma process according to the present invention.

Turning now to FIG. 1, a method 20 for characterizing a semi-conductor plasma process and chamber is shown. While the present invention will be primarily described with respect to a plasma etching process, it is important note that the present invention is not so limited. Furthermore, while the examples described herein will often relate to end point detection, other process parameters such as etch rate, chamber maintenance, and diagnosis of chamber equipment can readily benefit from the present invention. Specific examples are therefore used for discussion purposes only.

Generally, the method 20 involves collecting input and output training data 24 at step 22, where the input training data is based on variables associated with electrical power used to control a plasma chamber 70. It can be seen that the plasma chamber 70 has an associated power delivery system 30. By monitoring the power delivery system 30 with an impedance analyzer 100 a number of variables such as voltage root mean square (RMS), current RMS, phase angle between voltage and current, and fundamentals of harmonics of multiple RMS fundamentals can be monitored. Other variables include complex and polar impedance, and power delivered to the plasma chamber 70. One such RF impedance analyzer is available from ENI Technology, Inc. under the product name V/I Probe.

It should be noted that the training data 24 includes input training data (e.g., X values) and output training data (e.g., Y values) relating to the etching process. As already discussed, the input training data relates to power delivered to the chamber 70 and can be collected by the impedance analyzer 100. Thus, any parameter monitored by the impedance analyzer 100 can serve as a source for the input training data. It is also important to note that multiple inputs are possible depending upon the application. The output training data relates to the particular output parameter being characterized and can be collected by any number of data collection devices such as a scanning spectrophotometer or residual gas analyzer. At any rate, the training data 24 results from execution of the plasma process to be described below.

At step 26, a fuzzy inference system is generated which includes the input and output membership functions and fuzzy rules 28 that are based on the training data 24. The membership functions and fuzzy rules 28 enable subsequent estimation of various output parameter values of the plasma process such that the membership functions 28 characterize the plasma process with regard to the output parameters. Thus, if the output parameter is an end point estimation, the membership functions 28 will map subsequent input data obtained from the power delivery system 30 and impedance analyzer 100 to a predicted end point of the etch in question. It is important to note that the method 20 shown in FIG. 1 represents the steps taken to initially establish an adaptive plasma characterization system (APCS). As will be discussed below, the plasma characterization system is also able to learn after being implemented in the field. It is also important to note that once the APCS is established, it can be used with equipment other than the equipment on which it was trained. Thus, the resulting APCS is adaptable to other chambers, power delivery systems, and impedance analyzers, hence the name adaptive plasma characterization system.

Figure 2:
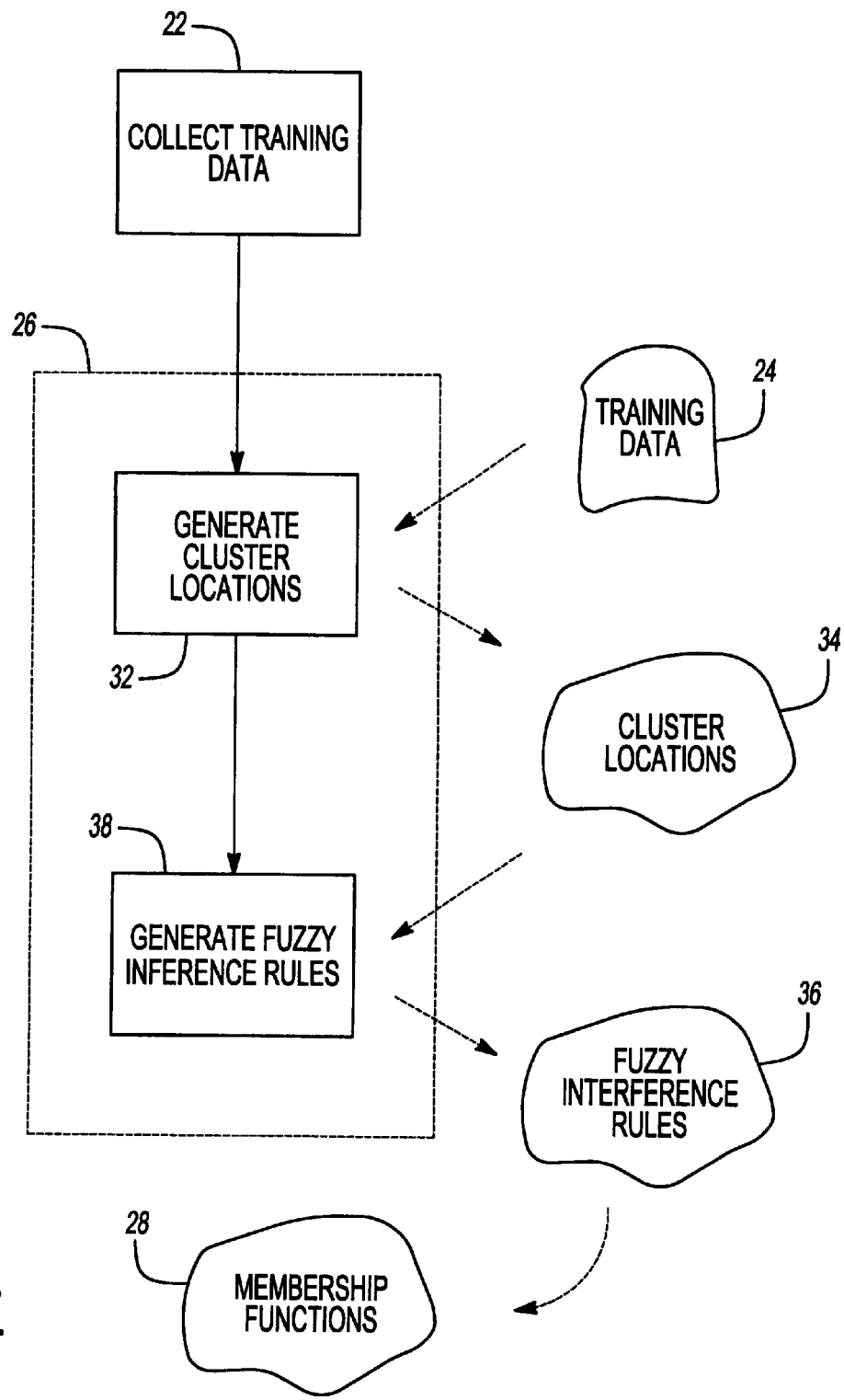
FIG. 2 is a flow diagram showing a preferred approach to generating fuzzy logic-based input and output membership functions.

Turning now to FIG. 2, one approach to generating the membership functions 28 at step 26 is shown in greater detail. Specifically, it can be seen that at step 32 cluster locations 34 are generated based on the training data 24. Fuzzy inference rules 36 are generated based on the cluster locations 34 at step 38. As will be discussed in greater detail below, the fuzzy inference rules 36 essentially define the input and output membership functions 28.

Figure 3:
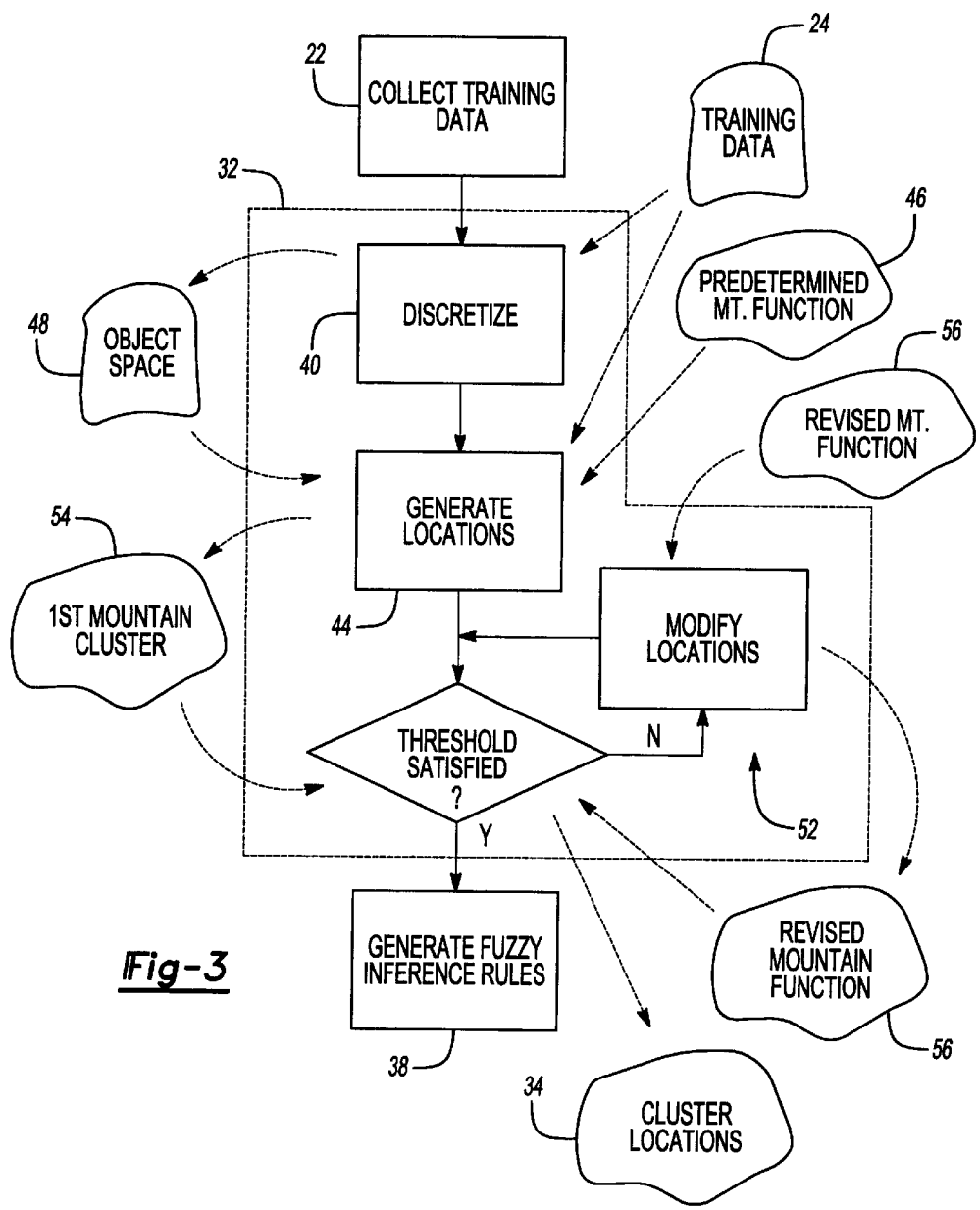
FIG. 3 is a flow diagram showing a preferred approach to generating cluster locations.
Figure 5:
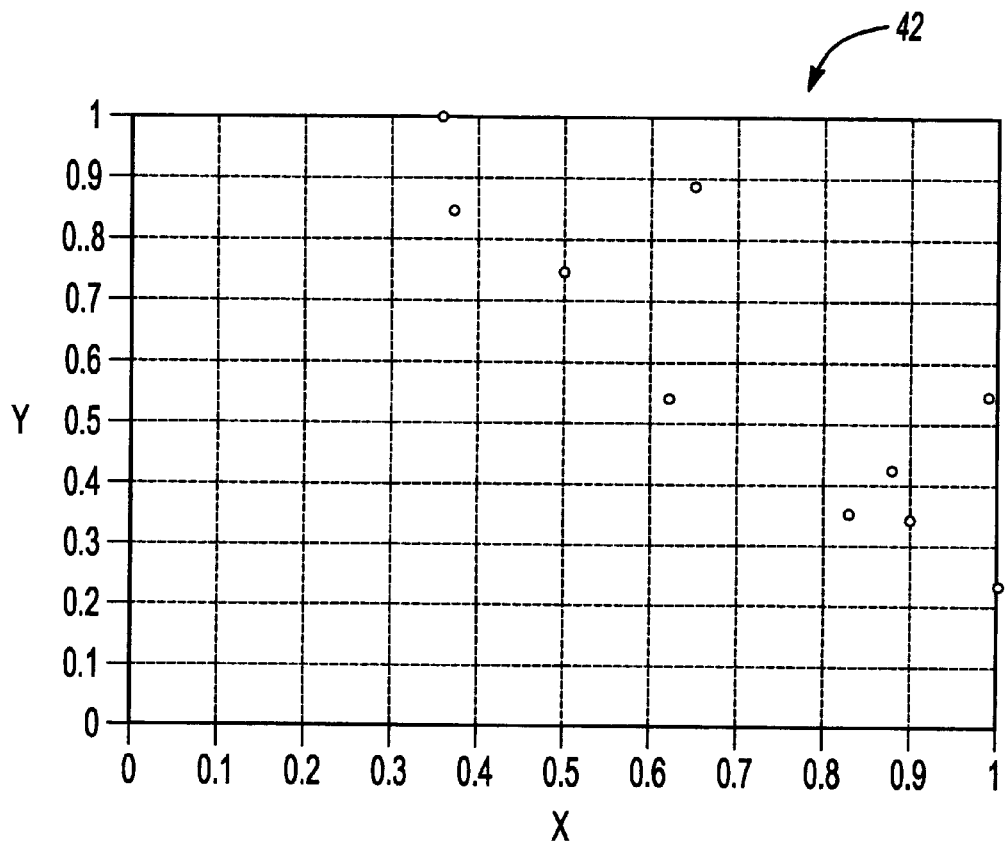
FIG. 5 is a plot of input and output data points according to one embodiment of the present invention.

FIG. 3 demonstrates the preferred approach to generating cluster locations 34 at step 32. It will be appreciated that fuzzy inference systems can be developed using either intuitive logic or algorithm-based models. The preferred embodiment will be described with respect to a mountain clustering algorithm. Other similar approaches include K-means algorithms and C-means algorithms. These approaches are statistical in nature. The present invention, however, is not limited to any of these approaches. Nevertheless, it can be seen that at step 40 an object space 48 of the training data 24 is discretized. FIG. 5 shows a plot 42 mapping each unique input X to an output Y. The variable X represents the input value for the parameter of interest and the variable Y represents the corresponding output value. For example, if the parameter of interest is etch rate, X might represent the instantaneous phase angle between the voltage and current applied to the chamber at a given moment in time. Using well known etch rate measurement techniques, the corresponding Y value can be determined, and the X, Y coordinate pair can be represented in the object space 48.

It can be seen that X and Y samples are contained in the range of zero to one. In this example, the object space is discretized into ten evenly spaced intervals. It will be appreciated that the interval spacing of regions in the object space having a relatively high concentration of data can be adjusted to best realize a clustering for that data. Thus, the intervals do not have to be evenly spaced and do not have to be identical for each input or output. Nevertheless, the interval spacing for plot 42 was selected as 0.1 for both the input and output data space. The intersection of each input and output interval is referred to as a node. Thus, the object space of plot 42 contains 100 nodes.

Returning now to FIG. 3, it can be seen that at step 44 the cluster locations 34 are generated based on the training data 24 and a predetermined mountain function 46. The cluster locations 34 are positioned within the object space 48. It is preferred that the predetermined mountain function 46 is applied to each data sample in the entire object space 48 and is defined by:

$$M(Nij) = \sum_k e^{-(\alpha d(Nij,S))}$$

where Nij represents the node at location i and j; S is data sample (X(k), Y(k)); α is the learning rate; and d (Nij, S) is the Euclidean distance function between Nij and S.

Figure 6:
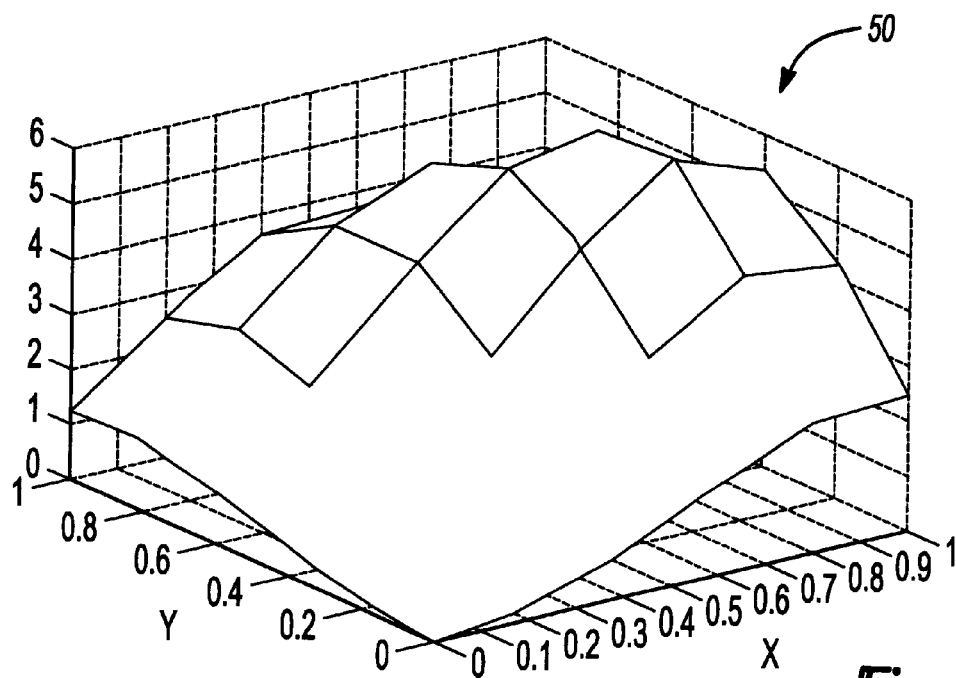
FIG. 6 is a plot resulting from application of a predetermined mountain function according to one embodiment of the present invention.

The three dimensional plot 50 in FIG. 6 represents the result of applying the mountain function to the data contained in FIG. 5. It should be noted that the peak location for the resulting mountain cluster is located at X coordinate 0.8 and Y coordinate 0.4. This coordinate position matches the data points located in the lower right portion of the object space in FIG. 5. Returning now to FIG. 3, it can be seen that at step 52 the cluster locations 34 are modified until a predetermined threshold criteria is satisfied such that the modified cluster locations have cluster centers that match other data clusters in the object space 48. Specifically, this is accomplished by destructing the initial mountain cluster 54 defined by the cluster locations and applying a revised mountain function 56 to the destructed mountain cluster. The preferred revised mountain function 56 is defined by:

$$M'_{k+1}(Nij) = M'_k(Nij) - M^*_k e^{-(\beta d(N^*, Nij))}$$

where Nij represents the node and location i and j; $M^*_k$ is the max value of cluster iteration k; $M'_k$ is the mountain cluster value at node Nij from cluster iteration k; $M'_{k+1}$ is the updated mountain cluster value at node Nij; N* represents the node location with the max value of cluster iteration k; β is the learning rate; and d(*N, Nij) is the Euclidean distance function between N* and Nij.

Figure 7:
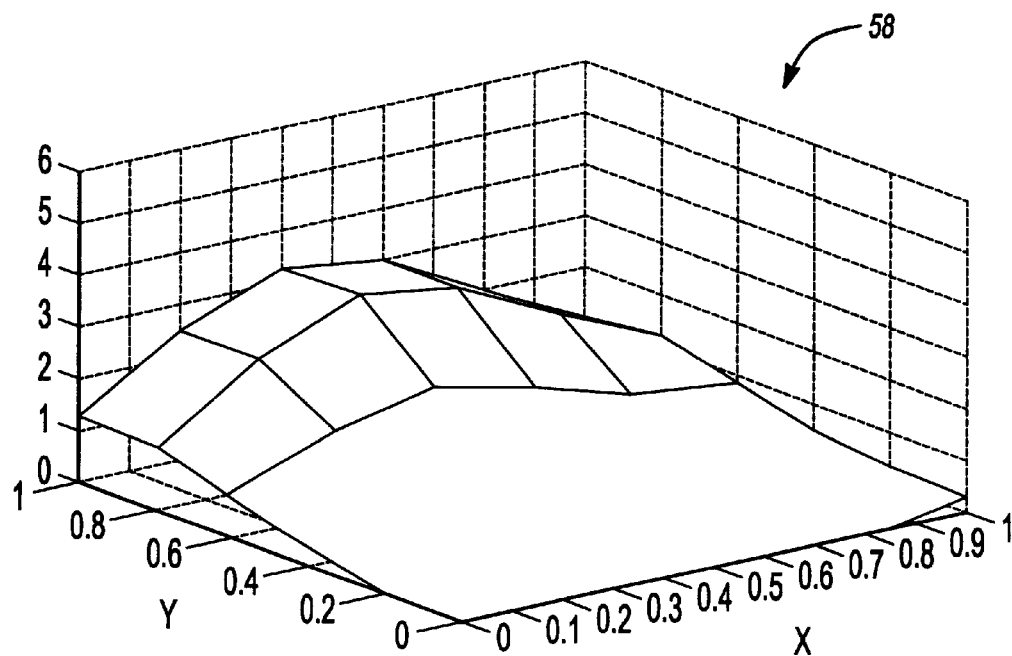
FIG. 7 is a plot resulting from application of a revised mountain function according to one embodiment of the present invention.

FIG. 7 illustrates the results of applying the revised mountain function to the data contained in FIG. 6 at plot 58. It should be noted that the peak location from FIG. 6 has been destructed and the new mountain cluster peak is located at X coordinate 0.4 and Y coordinate 0.8. This coordinate position matches the data points in the upper left portion of the object space in FIG. 5. It will also be appreciated that the above clustering steps are repeated iteratively until all data sample clusters have been formed. These iterations therefore continue until a minimum threshold criteria on M* has been satisfied.

Figure 8:
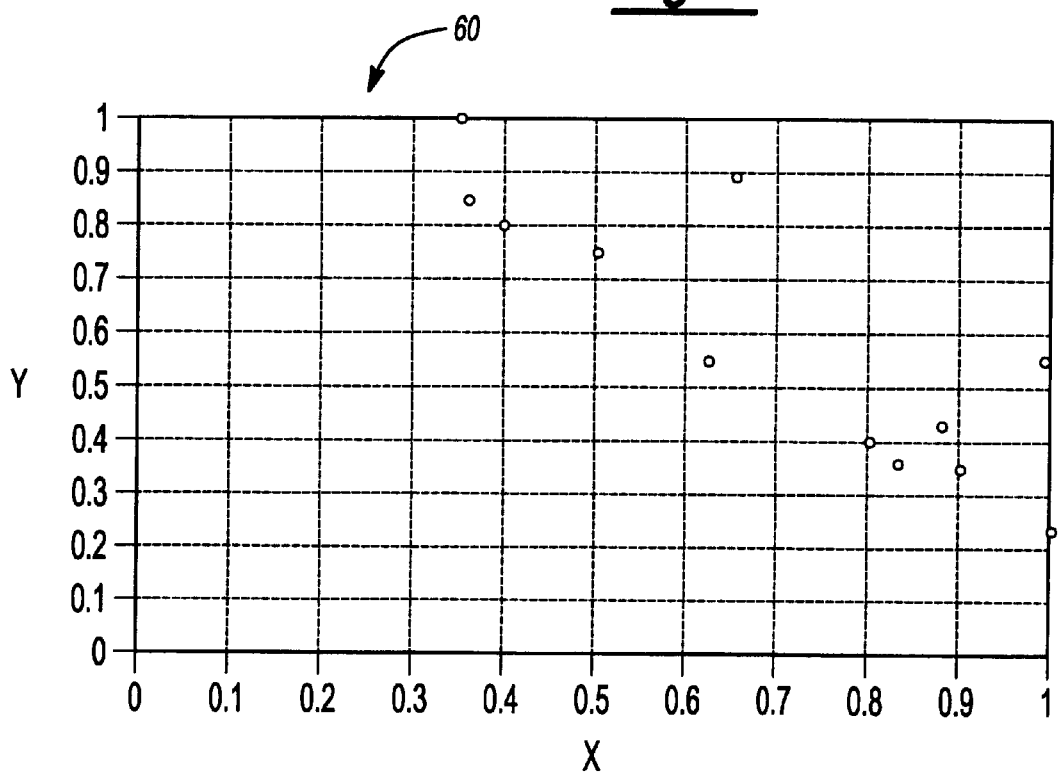
FIG. 8 is a plot of input and output data points with cluster locations according to one embodiment of the present invention.

The above example has demonstrated the preferred mountain clustering approach. From the data samples of FIG. 5, two clusters were identified at (X, Y) coordinates 0.8, 0.4 and 0.4, 0.8. FIG. 8 demonstrates a plot 60 of the data points with the cluster locations identified.

Returning now to FIG. 2, it can be seen that once the threshold criterion has been satisfied, the cluster locations 34 are passed to the fuzzy inference system. These cluster locations 34 are used to develop and input and output membership functions 28 of the fuzzy inference system.

Figure 4:
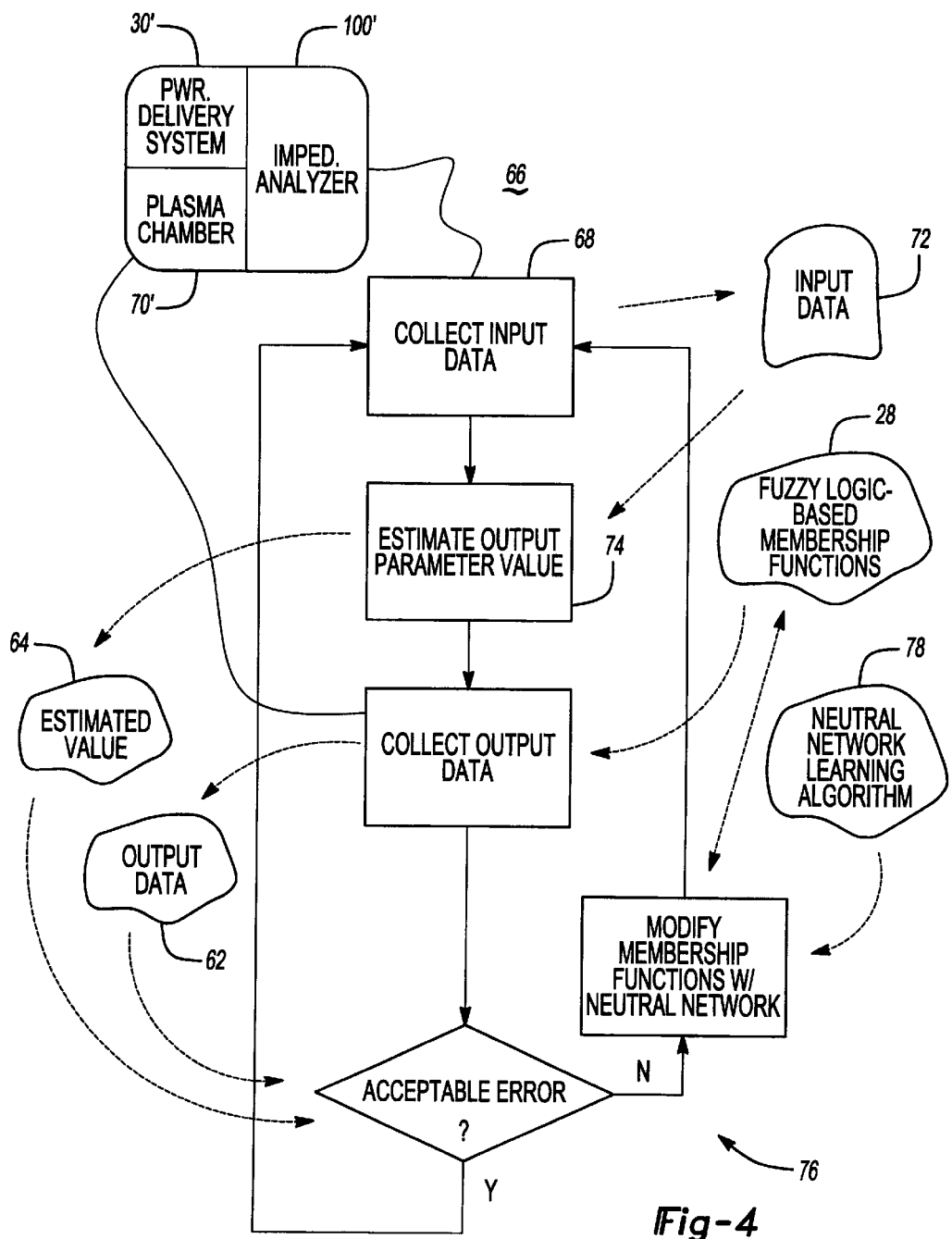
FIG. 4 is a flow diagram demonstrating a method for estimating an output parameter value of a semiconductor plasma process according to the present invention.

Turning now to FIG. 4, it will be appreciated that the initial conditions established with the cluster nodes will result in a certain amount of error between the actual output data 62 and the estimated value 64 (i.e., the fuzzy inference output). The error may or may not be satisfactory for the given application. To minimize this error, a neural network training process is applied to modify the cluster node locations. Modification of the cluster locations effectively "tunes" the input and output membership functions 28 of the fuzzy inference system to reduce the error between the output data 62 and the output of the fuzzy inference system.

Thus, the present invention provides a method 66 for estimating an output parameter value of a semi-conductor plasma process. Generally, the method includes the step 68 of collecting input data 72, where the input data 72 is based on variables associated with electrical power used to control a plasma chamber 70'. The input data 72 therefore corresponds to execution of the plasma process. At step 74 the output parameter value is estimated based on fuzzy logic-based input and output membership functions 28. At step 76 the membership functions 28 are modified based on a neural network learning algorithm 78 and output data 62. As already discussed, the output data 62 defines an actual parameter value resulting from execution of the plasma process.

The output data 62 can be obtained using any of a number of well known techniques. For example, etch rate and end point detection is often measured using residual gas analyzers, visual inspection (with a crystal peering scope), or a scanning spectrophotometer.

The operation of method 66 can better be understood through the following example. Suppose we are given a two-dimensional non-linear system with a describing function of:

$$y(k) = 2.5(x - 0.45)^2 = \text{noise}(k);$$

$$x(k) = 0.5 \sin(pik) + 0.5$$

where the noise is a normal distribution with mean zero and variance 0.00114.

Figure 9:
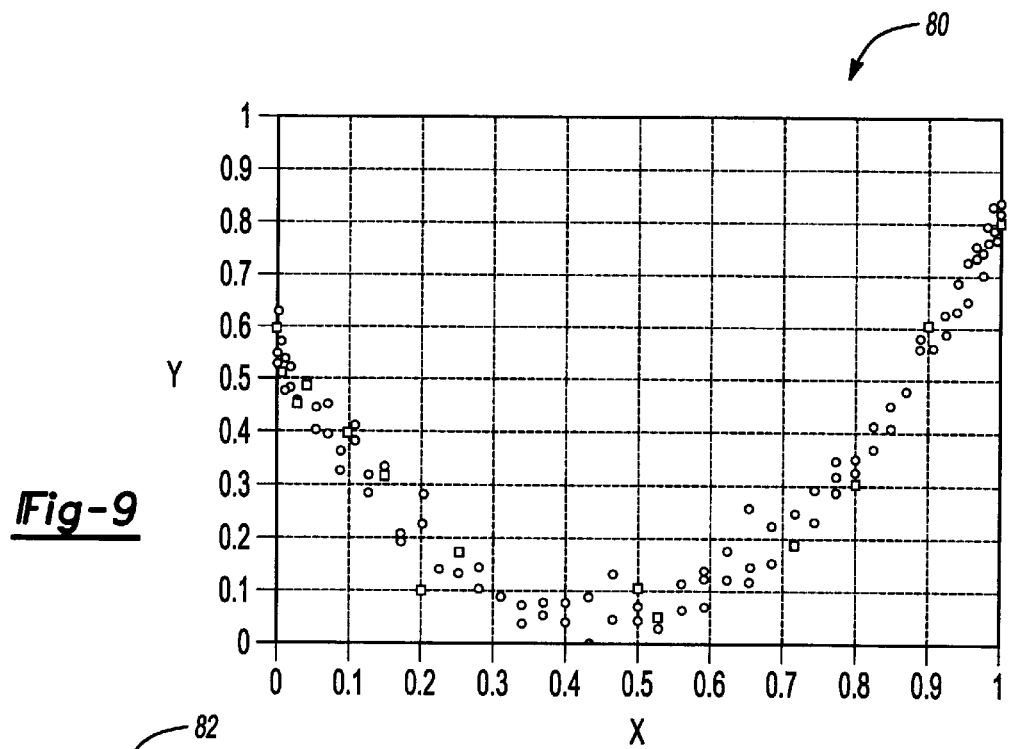
FIG. 9 is a plot of data points and cluster locations for a non-linear system according to one embodiment of the present invention.

The plot 80 in FIG. 9 identifies the input and output data for this non-linear system. In plot 80 the square data points indicate the cluster locations derived by the above-described mountain clustering algorithm. It will appreciated that in this example each cluster location maps to seven input and seven output membership functions. Since this is a simple two-dimensional mapping, the fuzzy rules are relatively straight-forward. In a linguistic fuzzy model, these fuzzy rules would be:

"If A is $A_i$ and B is $B_i$ . . . then Y is $Y_i$."

where i represents one of m fuzzy rules; $A_i$, $B_i$, . . . are individual membership functions related to the input X; and $Y_i$ is the i th output membership function related to output Y.

These fuzzy rules can be understood as:

"If the input X(A) is close to the cluster node $A_i$ and . . . then the consequence Y is $Y_i$."

Suppose we look at the cluster located at node x=0.5 and y=0.1 in FIG. 9. In the fuzzy rule stated above, $A_i$ is 0.5 and is 0.5 and $Y_i$ is 0.5.

Note that although in this example there is one fuzzy rule per cluster node, the present invention is not restrained to this arrangement. The one-to-one relationship is only provided for the purposes of simplifying discussion.

Figure 10:
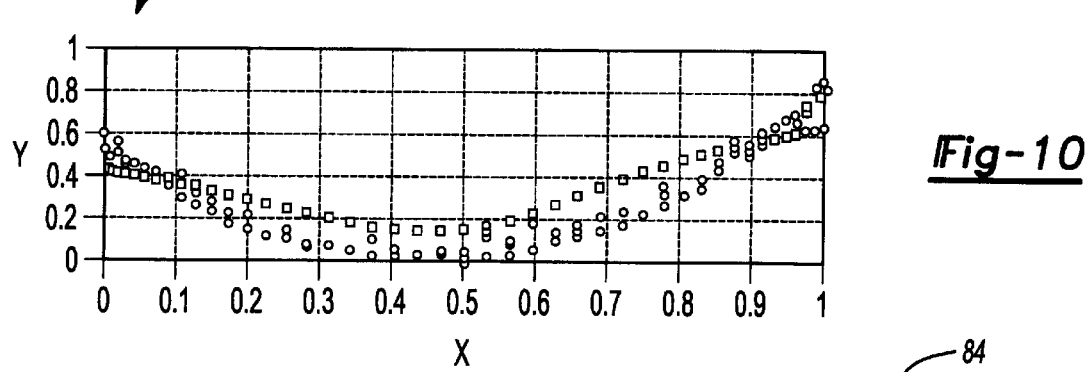
FIG. 10 is a plot demonstrating initial estimated output parameter values according to one embodiment of the present invention.
Figure 11:
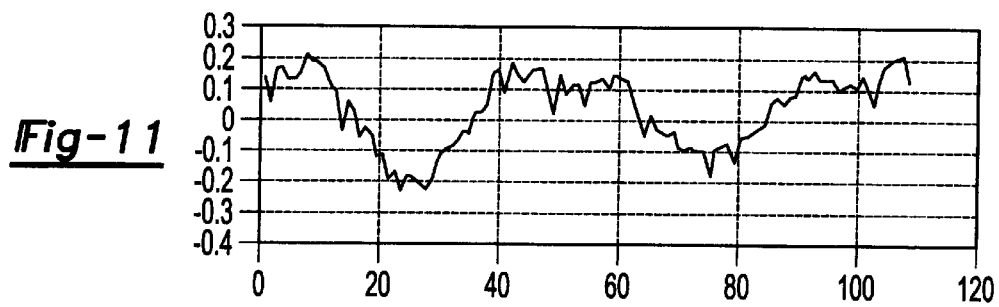
FIG. 11 is a plot showing the error between estimated output parameter values and actual output parameter values for the plot shown in FIG. 10.

If we used the above initial cluster locations and applied the fuzzy inference system to each input data sample to derive an estimated output, the error would be in the range of approximately +/−0.2. The plot 82 of FIG. 10 illustrates the actual Y output (circle data points) and the estimated Y output (square data points) from the fuzzy inference system for each input data point. FIG. 11 shows the error between the actual Y output and the estimated Y output from the fuzzy inference system at plot 84.

As already discussed, the estimated value of Y is derived through the application of the fuzzy inference system. The first step of the fuzzy inference system is to find the firing value for each rule. In this simplified example, there are seven fuzzy rules—one for each cluster node location indicated in FIG. 9.

The firing value, FV, for the i th fuzzy rules is determined by the equation:

$$FV_i = \tau_i y_i^-$$

where $\tau_i$ is the membership of the input to an i th input membership function, i.e., $A_i x$, and $y_i^-$ is the centroid of the i th output membership function.

The final value of the fuzzy inference system, y', is the sum of the FV divided by the sum of τ.

For an initial estimate, the mountain clustering function was able to provide an initial characterization of the non-linear system. To improve upon this initial characterization, a back propagation learning algorithm is applied to the membership functions. The back propagation learning algorithm is defined by the following recursive equations:

$$y\bar{i}(k+1) = y\bar{i}(k) - \alpha v_i e;$$

$$x_i^-(k+1) = x_i^-(k) - \alpha v_i(y_i'(k) - y(k))ex(k)((x(k) - x_i^-)/\sigma_i^-(k));$$

$$\sigma_i(k+1) = \sigma_i(k) - \alpha v_i(y\bar{i}'(k) - y(k))ex(k)((x(k) - x_i^-)^2/\sigma_i^3(k));$$

$$e = y'(k) - y(k);$$

$$v_i = \tau_i/\Sigma\tau.$$

Figure 12:
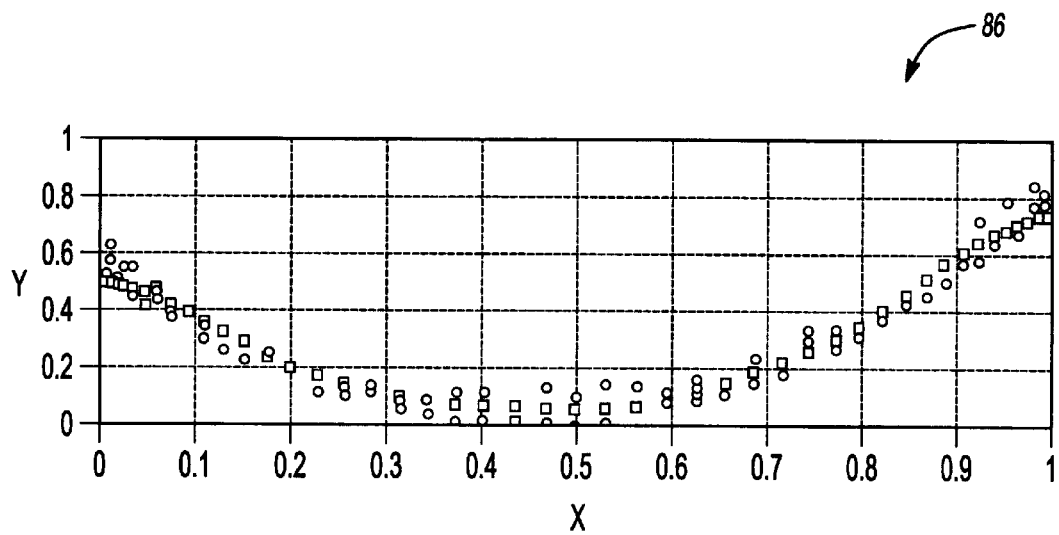
FIG. 12 is a plot showing estimated output parameter values for modified membership functions according to one embodiment of the present invention.
Figure 13:
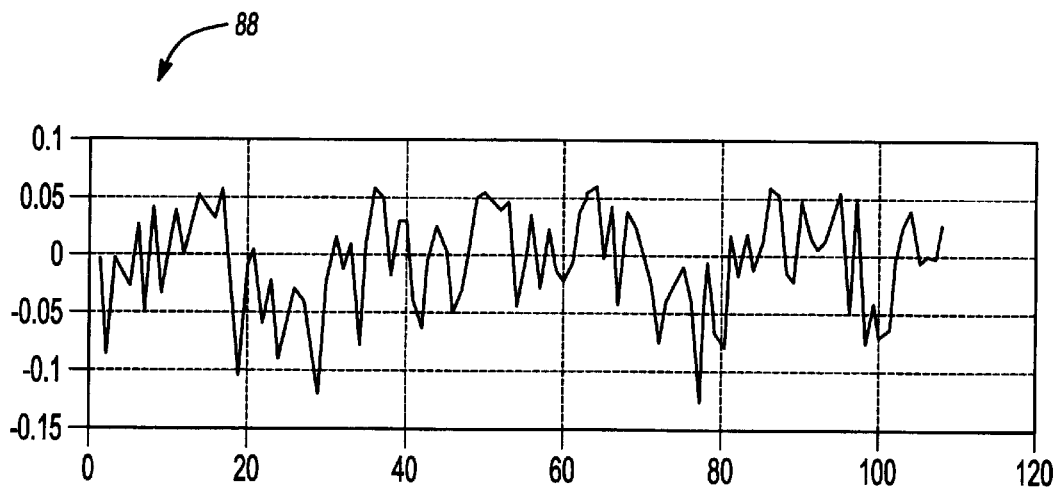
FIG. 13 is a plot showing the error between estimated output parameter values and actual output parameter values for the plot shown in FIG. 12.

After training the neural network for 1000 epochs and replacing the new membership functions, plot 86 in FIG. 12 and plot 88 in FIG. 13 provide the results for the trained fuzzy inference system.

Figure 14:
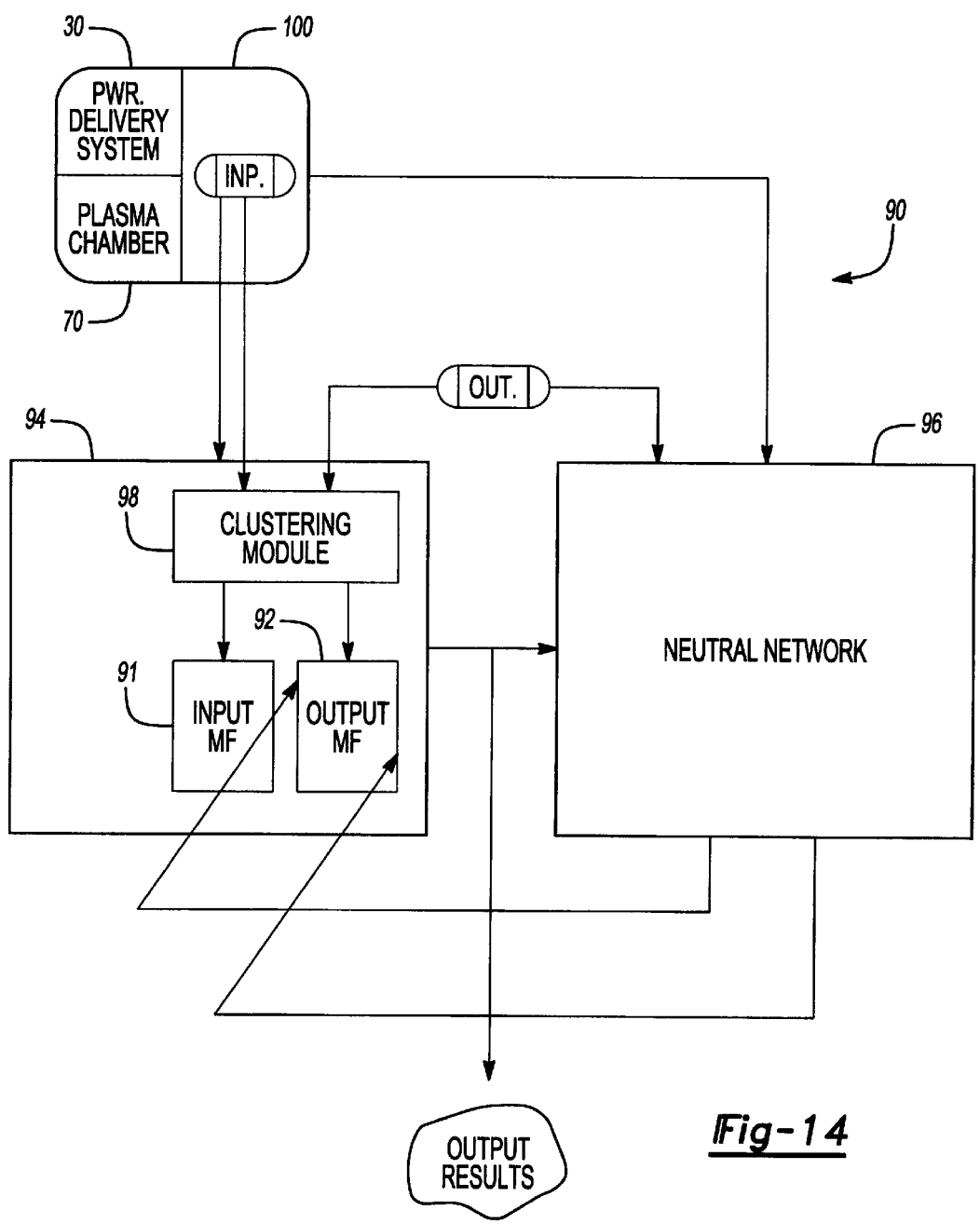
FIG. 14 is a block diagram of an adaptive plasma characterization system according to one embodiment of the present invention.

Turning now to FIG. 14, an adaptive plasma characterization system 90 (APCS) is shown according to the present invention. Generally, it can be seen that an impedance analyzer 100 is connected to a power delivery system 30 of a plasma chamber 70. The analyzer 100 collects data resulting from execution of a plasma process and the data is based on variables associated with electrical power used to control the plasma chamber 70. A fuzzy inference system 94 generates fuzzy logic-based input and output membership functions 91, 92 based on the data. The membership functions enable autonomous estimation of an output parameter value of the plasma process. A neural network 96 modifies the membership functions based on a neural network learning algorithm and output data defining an actual parameter value resulting from execution of the plasma process. It can be seen that the fuzzy inference system 94 preferably includes a clustering module 98 for generating cluster locations based on the data. The fuzzy inference system generates fuzzy inference rules based on the cluster locations, where the fuzzy inference rules define the input and output membership functions 91, 92. It is also preferred that the clustering module 98 modifies the cluster locations until a predetermined threshold criteria is satisfied such that the modified cluster locations have cluster centers that match other data clusters.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for characterizing a semiconductor plasma process, the method comprising the steps of:

collecting input and output training data, the input training data being based on variables associated with electrical power used to control a plasma etching chamber and resulting from execution of the plasma process;

discretizing an object space of the training data;

generating the cluster locations based on the training data and a predetermined mountain function, the cluster locations being positioned within the object space;

modifying the cluster locations until a predetermined threshold criteria is satisfied such that the modified cluster locations have cluster centers that match other data clusters in the object space; and generating fuzzy inference rules based on the cluster locations, where said fuzzy inference rules define fuzzy logic-based input and output membership functions, said membership functions enabling estimation of an output parameter value of the plasma process such that the membership functions characterize the plasma process with regard to the output parameter.

2. The method of claim 1 further including the step of adjusting an interval spacing of regions in the object space having a relatively high concentration of training data.

3. The method of claim 1 wherein the predetermined mountain function is defined by:

$$M(Nij) = \sum_k e^{-(\alpha d(Nij,S))}$$

where Nij represents the node at location i and j; S is data sample (X(k),Y(k)); α is the learning rate; and d(Nij, S) is the Euclidean distance function between Nij and S.

4. The method of claim 1 further including the steps of:
destructing a mountain cluster defined by the cluster locations; and
applying a revised mountain function to the destructed mountain cluster.

5. The method of claim 4 wherein the revised mountain function is defined by:

$$M'_{k+1}(Nij)=M'_k(Nij)-M^*_k e^{-(\beta d(N^*,Nij))}$$

where Nij represents a node at location i and j, $M^*_k$ is a max value of cluster iteration k, $M'_k$ is a mountain cluster value at node Nij from cluster iteration k, $M'_{k+1}$ is an updated mountain cluster value at node Nij, N* represents a node location with the max value of cluster iteration k, β is a learning rate, and d(*N, Nij) is a Euclidean distance function between N* and Nij.

6. The method of claim 1 further including the step of connecting an impedance analyzer to the plasma etching chamber, the impedance analyzer generating the input training data in response to the execution of the plasma process.

7. A method for estimating an output parameter value of a semiconductor plasma process, the method comprising the steps of:
collecting input data, the input data being based on variables associated with electrical power used to control a plasma etching chamber and corresponding to execution of the plasma process;
discretizing an object space of the input data;
generating the cluster locations based on the input data and a predetermined mountain function, the cluster locations being positioned within the object space;
modifying the cluster locations until a predetermined threshold criteria is satisfied such that the modified cluster locations have cluster centers that match other data clusters in the object space;
generating fuzzy logic-based input and output membership functions based on the cluster locations, such that the membership functions characterize the plasma process;
estimating the output parameter value based on fuzzy logic-based input and output membership functions; and
modifying the membership functions based on a neural network learning algorithm and output data, the output data defining an actual parameter value resulting from execution of the plasma process.

8. The method of claim 7 further including the step of applying a back propagation learning algorithm to the membership functions.

9. The method of claim 7 further including the step of estimating an etch rate value, the etch rate value defining a rate at which the plasma process takes place.

10. The method of claim 7 further including the step of estimating a end point value, the end point value defining an end point of the plasma process.

11. The method of claim 7 further including the step of estimating a maintenance condition value, the maintenance condition value defining a maintenance condition of the plasma etching chamber.

12. The method of claim 7 further including the step of estimating an equipment condition value, the equipment condition value defining a condition of equipment used in the plasma process.

13. The method of claim 7 further including the step of connecting an impedance analyzer to the plasma etching chamber, the impedance analyzer generating the input data in response to execution of the plasma process.

14. A method for characterizing a semiconductor plasma etching process, the method comprising the steps of:
collecting input and output training data, the input training data being based on variables associated with electrical power used to control a plasma etching chamber and resulting from execution of the plasma etching process;
discretizing an object space of the training data;
generating cluster locations based on the training data and a predetermined mountain function, the cluster locations being positioned within the object space;
modifying the cluster locations until a predetermined threshold criteria is satisfied such that the modified cluster locations have cluster centers that match other data clusters in the object space;
generating fuzzy inference rules based on the cluster locations;
said fuzzy inference rules defining input and output membership functions;
said membership functions enabling estimation of an output parameter value of the plasma etching process such that the membership functions characterize the plasma etching process with regard to the output parameter; and
modifying the membership functions based on a neural network learning algorithm and output data, the output data defining an actual parameter value resulting from execution of the plasma etching process.

15. The method of claim 14 further including the step of applying a back propagation learning algorithm to the membership functions.

* * * * *